(12) United States Patent
Succi et al.

(10) Patent No.: US 7,034,716 B2
(45) Date of Patent: Apr. 25, 2006

(54) PASSIVE REAL-TIME VEHICLE CLASSIFICATION SYSTEM UTILIZING UNATTENDED GROUND SENSORS

(75) Inventors: George P. Succi, Newburyport, MA (US); Michael S. Richman, Bedford, MA (US); Douglas S. Deadrick, Derry, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 130 days.

(21) Appl. No.: 10/671,153

(22) Filed: Sep. 25, 2003

(65) Prior Publication Data

US 2005/0068199 A1 Mar. 31, 2005

(51) Int. Cl.
*G08G 1/01* (2006.01)

(52) U.S. Cl. .................. 340/935; 340/551; 340/566
(58) Field of Classification Search ................ 340/935, 340/551, 566, 565, 541; 367/118, 124, 136
See application file for complete search history.

(56) References Cited

U.S. PATENT DOCUMENTS

| | | | | |
|---|---|---|---|---|
| 3,719,891 A | * | 3/1973 | Lee | 367/137 |
| 4,158,832 A | * | 6/1979 | Barnes et al. | 340/943 |
| 4,601,022 A | * | 7/1986 | Muir | 367/14 |
| 4,630,246 A | * | 12/1986 | Fogler | 367/135 |
| 4,661,939 A | * | 4/1987 | Braunling | 367/136 |
| 5,107,250 A | * | 4/1992 | Pykett | 340/566 |
| 5,969,608 A | * | 10/1999 | Sojdehei et al. | 340/551 |

* cited by examiner

*Primary Examiner*—Phung T. Nguyen
(74) *Attorney, Agent, or Firm*—Daniel J. Long; Robert K. Tendler

(57) ABSTRACT

A system is provided for determining the type of vehicle which has never been sensed before that is transiting between a cluster of acoustic and seismic sensors by graphing an acoustic source level against a seismic source level for the vehicle, with light vehicles such as pick-up trucks being distinguished from heavy tracked vehicles such as tanks by where on the graph the plotted point for a vehicle lies.

12 Claims, 6 Drawing Sheets

PASSIVE REAL-TIME VEHICLE CLASSIFICATION SYSTEM UTILIZING UNATTENDED GROUND SENSORS

STATEMENT OF GOVERNMENT INTEREST

The invention described herein was made under Contract No. N66001-98-C-8515 with the Government of the United States of America and may be manufactured and used by and for the Government of the United States of America for Governmental purposes without the payment of any royalties thereon or therefore.

FIELD OF INVENTION

This invention relates to vehicles surveillance and more particularly to a passive real-time system for classifying vehicles.

BACKGROUND OF THE INVENTION

For many applications including both military and commercial, there is a requirement to be able to identify the type, size, and other characteristics of a vehicle as it travels over terrain. Especially in battlefield situations, it is important to be able to deploy a number of sensors which are unattended and to be able to track and classify the movement of vehicles through the area guarded by the sensors.

In the past, it has been the practice to obtain an acoustic signature of known vehicles and to compare the received acoustic signals with known signatures in order to ascertain, for instance, the type of vehicle by the sounds that it emits.

For instance, if one is to listen to the sounds from a tank of a predetermined make, one could look at the lines in the noise spectrum of the tank and identify it by the pattern of these lines.

The problem with such identification methods is that one has to have seen the vehicle beforehand and to have been able to measure its acoustic output. For most motorized vehicles utilizing internal combustion engines, by far the loudest sounds which emitted from the vehicle are those associated with the motor, and more particularly with the sounds which are emitted at the end of the muffler. However, the sounds that are made by a particular vehicle vary by the muffler that is utilized, and even, for instance, by the sounds made by a defective muffler.

Attempts have been made also to categorize the type of vehicle by the total amount of sound that it generates. However, whether one is obtaining an acoustic signature or one is obtaining the absolute magnitude of the sound, there are a number of things which affect the measurement. First is directivity in which the sound and sound patterns vary depending on the view of the object from different directions. While it is true that if the sound is emanating from a muffler, it is noted that the wave of the sound is much greater than the length of the muffler. This tends to provide a unidirectional pattern. However, there are some instances when the sound pattern is not unidirectional. It is noted that some vehicles have sound asymmetries which are in fact directional in nature. This therefore results in a directional signature and one which would require mapping to signatures derived from the vehicle at a number of locations around the vehicle.

The second problem is that the absolute value of the sound is more or less loud depending on how far one is from the source. One therefore needs to be able to derive an absolute level referenced to distance.

In addition to acoustic energy emitted by the vehicle, there is also seismic energy which is produced. Especially for heavy tracked vehicles such as tanks, the seismic energy can help in classifying what type of vehicle is making the seismic wave. For instance, the impact of the wheels or the tank treads on the ground as it is propelling the vehicle result in different seismic levels and signatures.

It is, however, to be noted that the seismic wave varies with the particular terrain both in terms of the consistency of the terrain, be it sand, dirt, rock, etc. but also in the near field and the far field. In general, for seismic energy in the 10–50 Hz range, the near field is defined as between 0 and 200 meters, whereas the far field is defined as between 200 meters and up. Seismic energy in the near field is characterized by a body wave, meaning the energy is projected into the earth and reflected back by the various layers or strata at the various locations.

The body wave, however, decreases in energy significantly after about 200 meters and therefore is not useful for seismic classification at such long ranges. However, a surface wave developed by the vehicle running over the terrain is useful in the far field to identify the seismic source level.

Because the variability of the strata and the types of terrain over which the vehicle is traversing, identification by seismic energy alone is quite difficult. Since both acoustic energy and seismic energy decay as $1/\text{distance}$ or $1/\text{distance}^2$ respectively, in order to use absolute values of either of the acoustic or seismic levels arriving at a sensor, it is necessary to know the distance of the vehicle from the sensor so as to appropriately apply the appropriate exponential decay factor to collected data, both for seismic and acoustic sources.

While it is relatively simple to apply attenuation factors to acoustic data, attenuation of seismic waves in the ground is dependent upon the terrain itself. Thus the absolute level of an acoustic signal can be calculated from a reference level and a factor of $10^{-\alpha R}/R$ which involves the distance of the source from the sensing device.

SUMMARY OF THE INVENTION

Rather than utilizing acoustic or seismic signatures to determine the identity of the vehicle, in one embodiment of the subject invention an array of sensors is deployed in an unattended manner over terrain.

Each of the sensors has an array of microphones and a geophone, with the array of microphones being utilized to triangulate on the sound source through a system described in U.S. patent application Ser. No. 10/200,638 entitled Multi-sensor Target Counting and Localization system filed by Stephen Robert Blatt on Jul. 22, 2002, now U.S. Pat. No. 6,690,321 issued Feb. 10, 2004.

This patent application describes the use of micro internetted unattended ground sensors called MIUGS which involves the use of small arrays of microphones and a small geophone.

In order to do direction finding, one utilizes a small array with four different microphones to be able to tell the direction of the sound source. The direction is determined by phase differences of the sound wave at its arrival at the microphones.

While the direction of the bearing line to the source can be ascertained in this manner, the absolute value of the noise differs with range to the vehicle due to geometric spreading and other factors.

In one embodiment, the subject system makes an estimate of the distance to the source using triangulation and then makes an independent measurement of the noise of the vehicle knowing the noise at the receiver and the distance away. One can therefore calculate a reference noise at a reference distance.

Since sound travels at a known velocity and with a known attenuation through the air, all that is necessary for determining the absolute value of the noise is to determine the distance of the noise source as mentioned above.

In terms of vehicle detection, for instance, for a light vehicle such a pick-up truck, one might want to space the sensors perhaps 100 meters off the road. If one is attempting to listen to listen to something heavy like a tank, one might want to space the sensors up to 300 meters off the road. In one embodiment, arrays of sensors include four devices which are typically spread on a square that has 300 meters on a side.

It can be seen that knowing the distance to a sound source is useful in obtaining the absolute value of the noise at a particular sensor and to be able, for instance, to categorize the source of the noise based on the amount of noise that it is making.

However, especially with military vehicles, sound generation is to be minimized and it is often times convenient to be able to make a determination of the identity of the vehicle by utilizing not only its acoustic output but also its seismic output. In either case, feature vectors can be developed utilizing a Fourier transform technique to provide the spectra in each case.

However, while to some extent one can classify vehicles by their spectral signatures, be they acoustic or seismic, this only applies to vehicles that one has already seen. In order to be able to classify vehicles that one has not seen, in the subject invention, one graphs acoustic response against the seismic response for the vehicle.

For instance, for lightweight vehicles such as pick-up trucks and the like, the combined acoustic/seismic data will lie towards the origin of the graph, whereas tanks, which make much more acoustic and seismic noise lie out from the origin of the graph.

However, to be able to supply data points for the graph, one needs to know an absolute level either for acoustic signals or for seismic signals. One also needs in the case of seismic data to know the local exponential decay function. How one derives absolute levels and decay functions is as follows:

In the subject invention, the distance to the sensor of the vehicle is known by triangulation so that at least the attenuation of the acoustic signal, being uniform in the atmosphere, can be calculated. However, for the seismic level, its seismic amplitude or level depends very much on the terrain.

How one calculates the absolute seismic level is by measuring the seismic output of the vehicle as it transits over the terrain monitored by the sensor array. Graphing the seismic response versus known distance provides a slope for the line for the data points, with the slope identifying the particular exponential attenuation factor to be applied to the seismic signals coming in at a particular sensor.

It has been found that the measured points for different vehicles cluster around a line which can be used in the absolute level calculation. This line will vary for the near field and the far field in that its slope, or $\alpha$, can be adjusted depending on the distance of the seismic source from the particular sensor.

Once having obtained absolute values or levels not only for the acoustic source but also for the seismic source, at for instance, a reference distance, then graphing these absolute levels of acoustic and seismic levels against each other, one develops a graphical representation of a space in which the lighter less noisy vehicles are closer to the origin of the graph whereas the heavier, more noisy vehicles are away from the origin of the graph. This correlates to the fact that lighter vehicles both make less noise and provide less seismic activity than do heavier tracked vehicles.

On viewing this graphical representation, it will be appreciated that a demarcation line may be drawn between the light wheeled vehicles and the heavy tracked vehicles, with data points existing to one side of the line being determined to be the light wheeled vehicles and data points to the other side of the line being determined to be the heavy tracked vehicles.

What will be seen is that there is an interplay between the seismic and acoustic levels, which are generally correlated. One can, in fact, have some vehicles which are disconfirming instances such as a vehicle having a bad muffler, but at least for military applications one recognizes that one does not want to give one's position away if one can help it. Thus, the correlation of the above graph is relatively accurate because the subject system utilizes triangulation to determine distance and because multiple measurements are made of the unknown vehicle as it traverses between the sensors. Because these measured data points determine the slope of a curve relating to alpha, then one can readily calculate the absolute level. Such a calculation is given by the following formulas:

$$A^2 = A_0^2 10^{-\alpha R}/R \qquad \text{(Equ. 1)}$$

Thus:

$$10 \log A^2 + 10 \log R = 10 \log A_0^2 - 10\alpha R \qquad \text{(Equ. 2)}$$

In order to obtain the absolute value, one measures $A^2$ and $R$ and then deduces $A_0^2$ and $\alpha$.

It will be appreciated that if one has an acoustic noise source one foot away and could measure 90 decibels, if the noise source moves two feet away than due to geometric spreading one would measure 6 dB less: with the sound source four feet away another 6 dB less. In short, for sound, for every doubling of distance the sound level diminishes as indicated above. Acoustically, the sound diminishes as $1/R^2$, whereas for seismic energy not all of the energy is constrained to the surface of the earth. One therefore has a 3 dB per doubling of distance of lost energy in addition to 3 dB of doubling per distance lost, with the attenuation depending on the site. Since in the subject invention one measured the site itself, one uses the target vehicle itself going by the sensors to measure what is called excess attenuation.

The result is that the system works with so-called targets of opportunity, namely vehicles that one has no knowledge about. If one plots $R$ versus the noise level it makes as the vehicle is going by, then one can find a fit to a line to that noise level. If it is seismic noise, the seismic noise diminishes as $1/R$ because one subtracts out the geometric part and everything that is left over is called excess attenuation. The above model documents that the seismic noise diminishes exponentially with distance and one measures the exponential factor, $\alpha$, which depends on the measured slope of the line from the aforementioned measured points. Notice that for the body wave there are in fact two waves that can propagate called longitudinal and transverse waves. This means that the particle motion is perpendicular or parallel to the direction of travel of the wave. These waves diminish as $1/R^2$ from the source$^2$.

There is also a surface wave that behaves much like a wave of water rolling on the surface of the water. The chief property of the surface wave is that it diminishes in intensity as 1/R from the source. So the basic assumption is that for surface seismic energy, it will diminish as 1/R from the source. However, if it is a body wave, it diminishes as $1/R^2$.

Thus, if one is very the source one can observe the body waves which theoretically propagate only into the earth itself. Since the ground has layers one sees reflections and this causes one to see more energy than one would otherwise see. The second thing that happens is that the ground is not a perfect elastic solid in that it has some attenuation itself and this attenuation is called excess attenuation which is what one tries to discover from the aforementioned measurements. One therefore looks to the experimental data as the vehicle moves by the sensors to determine the alpha for the near and far field pattern of the vehicle.

Thus, the system described above characterizes the ground and the attenuation in the ground, and discovers what the ground is doing so as to be able to take into account the discovered attenuation. Moreover, by using two measurements as opposed to one, one eliminates spoofing or false indication. Spoofing occurs more readily acoustically than it does seismically.

Moreover, certain attributes of a target emit better in different regimes. So whether the not the vehicle is a heavy vehicle or a light vehicle, for example, is one that can be detected in the seismic domain as opposed to the acoustic domain. The reason is that the differentiation is a 60 dB of separation seismically from the heaviest to the lightest vehicles, whereas there is only a 30 dB of separation from the heaviest to the lightest vehicles acoustically. What this means is that from the very lightest vehicle to the very heaviest vehicle, the difference in energy level is different by 6 orders of magnitude. Acoustically, the difference between the heaviest and lightest vehicle is on the order of 30 dB or 3 orders of magnitude. Thus, there is a factor of a million difference seismically over a factor of only one thousand acoustically.

While one could potentially fool an acoustic system by making a lot of noise acoustically, it is more difficult to fool a seismic system by making a lot of noise seismically. The reason is that one doesn't have the equivalent of a loud speaker or a hole in one's muffler seismically and one needs to heavily bump the ground in order for there to be a significant difference.

In one embodiment, a cluster of sensors, each equipped with a microphone array, a geophone, a real-time computer, and a radio, is deployed near a location where vehicles of interest will be passing by. A gateway node, equipped with a radio and a real-time computer, is deployed within radio contact of the sensors. Each sensor continuously computes the broadband acoustic energy contained in the frequency range 5–200 Hz and the broadband seismic energy contained in the frequency range 10–50 Hz.

As a vehicle passes by, each sensor detects the presence of the vehicle and computes an estimate of the bearing from the sensor to the vehicle using triangulation techniques. The gateway collects the bearing information from the various sensors and computes an estimate of the location of the vehicle in real-time, using a linear Kalman filter to track the vehicle as it proceeds through the sensor cluster.

Once a location is established, the gateway computes the distance from each sensor to the vehicle. With this range of information, each sensor is calibrated to determine the seismic propagation model for its deployment. The calibration consists of computing an exponential decay constant at the range 0 to 200 m and at the range 200–400 m using a least squares fit over 30 seismic energy measurements, with the decay constants computed only once per deployment.

The decay constant for the seismic transmission varies with the site due to the type of terrain and strata, with decay constant, $\alpha$, being derived from the measurements of the source at known distances from a sensor. After the decay constants are computed, the absolute values of the acoustic source level and the seismic source level of the vehicle are determined using an exponential decay model based on the computed decay constant for both acoustic and seismic propagation. Using data collected for both acoustic and seismic source levels, a probability map in the coordinate space given by the acoustic and seismic source levels is determined. Each pairing of seismic and acoustic source levels for a vehicle is compared with a collection of probability distributions in the coordinate space given by seismic and acoustic source levels for each of four categories: Heavy Tracked, Heavy Wheeled, Light Tracked, and Light Wheeled. The gateway then transmits to an operator a vehicle classification decision and a corresponding confidence value based on which type of vehicle the computed source levels best approximates.

In summary, a system is provided for determining the type of vehicle for a vehicle which has never been sensed before. The system uses received signals obtained while the vehicle is transiting between a cluster of acoustic and seismic sensors. The system makes a classification decision by graphing an acoustic source level against a seismic source level for the vehicle, with light vehicles such as pick-up trucks being distinguished from heavy tracked vehicles such as tanks by where on the graph this plotted point lies.

BRIEF DESCRIPTION OF THE DRAWINGS

These and other features of the subject invention will be better understood in connection with the Detailed Description in conjunction with the Drawings, of which.

DETAILED DESCRIPTION

Figure 1:
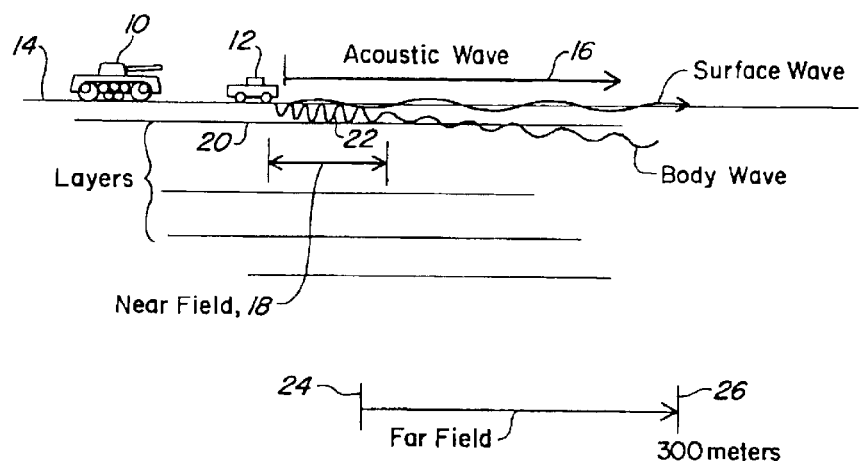
FIG. 1 is a diagrammatic illustration of the acoustic and seismic waves transmitted from a sound source such as a vehicle transiting along the surface of the earth, illustrating both the near field and the far field in which either the body wave or the surfaced seismic wave is more pronounced.

Referring to FIG. 1, a vehicle 10 which may be a tracked vehicle such as a tank, or vehicle 10 which is a small wheel vehicle such as a truck, as they traverse over the surface of the earth 14, produce acoustic waves such as illustrated at arrow 16 or two types of seismic waves. In the near field as illustrated by double-ended arrow 18 which may be out to 200 meters, the seismic energy is trapped between the surface and one or more layers 20 so that it reverberates in a channel as illustrated by body wave 22 which is diminished until it peters out at the start of the far field as illustrated at 24 which may be at 200 meters, with the far field extending, for instance, to 300 meters as illustrated at 26.

The acoustic wave extends outwardly from the vehicle and does not vary much in its properties neither in the near field nor in the far field.

In either case, both the seismic surface wave and the body wave decay in an exponential fashion depending on in the seismic case the type of terrain in addition to attenuation by geometric spreading. What is meant by type of terrain is the composition of the earth and its layered stratus such that the exponential decay constant for either the surface wave or the body wave depends directly on the particular terrain involved.

Figure 2:
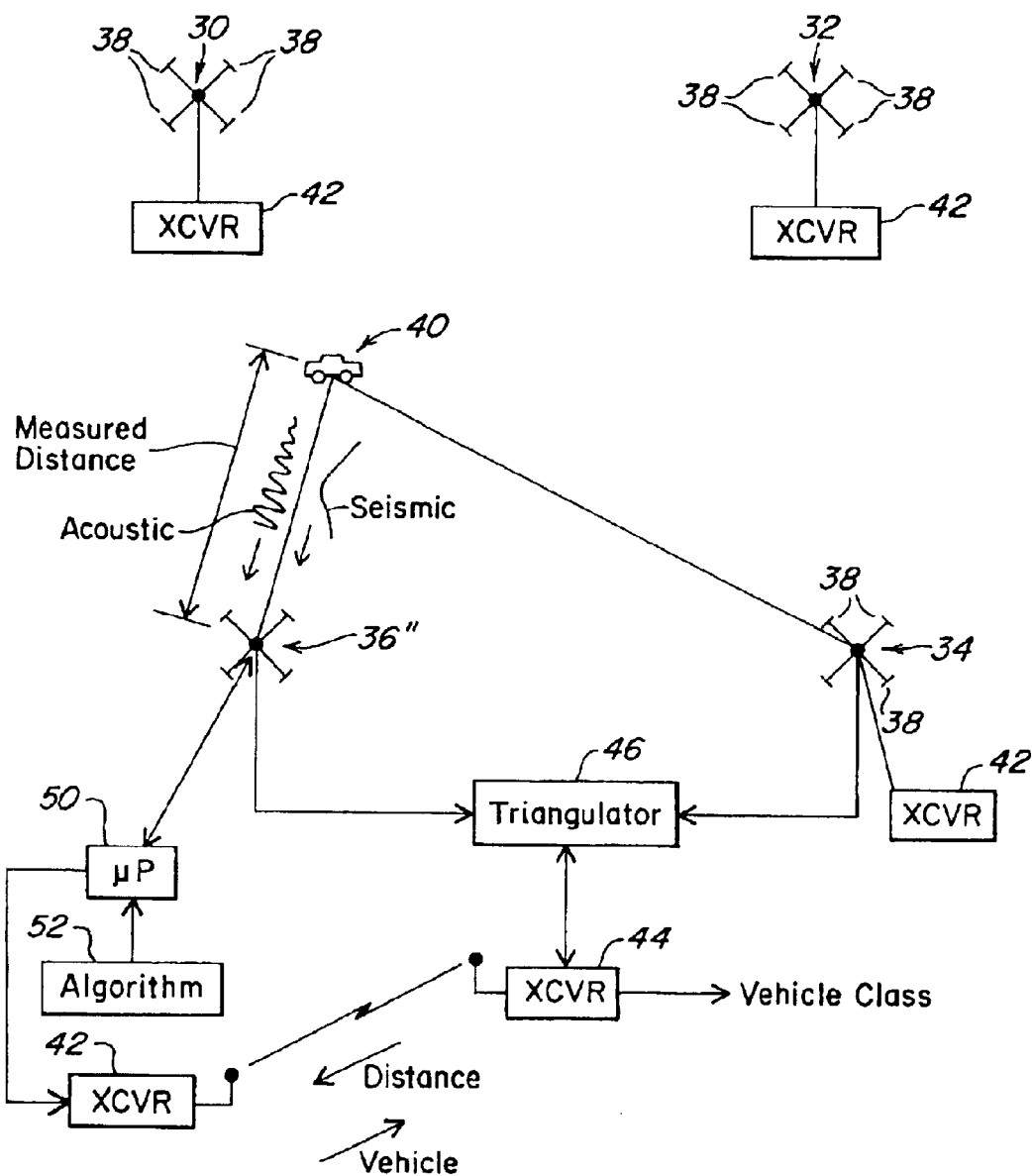
FIG. 2 is a diagrammatic illustration of the utilization of an array of acoustic/seismic sensors which are utilized first to generate the distance of the source from a sensor and then to compute the class of vehicle depending on acoustic and seismic energy from the source arriving at one of the sensors.

In order to passively sense the presence of a vehicle and referring now to FIG. 2, an array of sensors 30, 32, 34, and 36 are positioned about an area to be surveilled, sometimes a road, sometimes a path, and sometimes just simply an area within a field, forest or desert.

In the purpose of this array of sensors which in the subject case include four microphones per sensor here illustrated at 38 and a geophone, not shown in this figure.

It is the purpose of this array of sensors to sense the presence of an unknown or known vehicle 40 as it transits between the sensors, with its presence being acquired passively through listening to noise, be it acoustic noise or seismic noise, which is made by the vehicle. Each of the sensors is provided with a transceiver 42 which radios passively acquired information to a gateway comprising a transceiver 44.

During the acquisition phase the microphones permit triangulation on the vehicle through phase detection techniques utilized by a triangulation unit 46 so as to be able to ascertain, knowing the bearing lines and where they cross, the position of a vehicle as it transits the array.

Knowing the estimated position of the vehicle, one can measure the noise produced by the vehicle as, for instance, sensor 36' so as to acquire measured points at various distances from the sensor as the vehicle transits by it. These points are grouped into points as the vehicle approaches the sensor and points as they sensor moves away. These measured points are utilized to establish the exponential decay factor for both the acoustic energy and for the seismic energy both in terms of the near field body waves and the far field surface waves. Each of these exponential decay factors is different and is uniform with respect to the acoustic noise, but varies significantly when detecting seismic waves.

In one embodiment of the subject invention, the acoustic exponential decay factor is derived quite simply, whereas for the seismic exponential decay factors they are derived through a curve-fitting algorithm. For the unknown vehicle in question seismic level versus range is plotted for multiple points as the vehicle approaches sensor 36' and the goes away from it both in the near field and in the far field with the near field and far field being as defined in FIG. 1. The data from sensor 36' is acquired and processed by microprocessor 50 in accordance with an algorithm 52 to as to be able to process the measured points and to derive the exponential decay factor, in this case labeled alpha which is the slope of a line curve fit to the points in the near field and far field graphs. The slope of the line $\alpha$ determines not only the logarithmic relationship between distance and noise amplitude, it also permits one to deduce an absolute seismic noise level which is used in the formula: $A^2 = A_0^2 10^{-\alpha R}/R$ (Equ. 1).

Thus, what is done at sensor 36' after ascertaining the vehicle from the sensor is to measure amplitude, $A^2$, and measure range, R, and deduce $A_0^2$, and $\alpha$.

Figure 3:
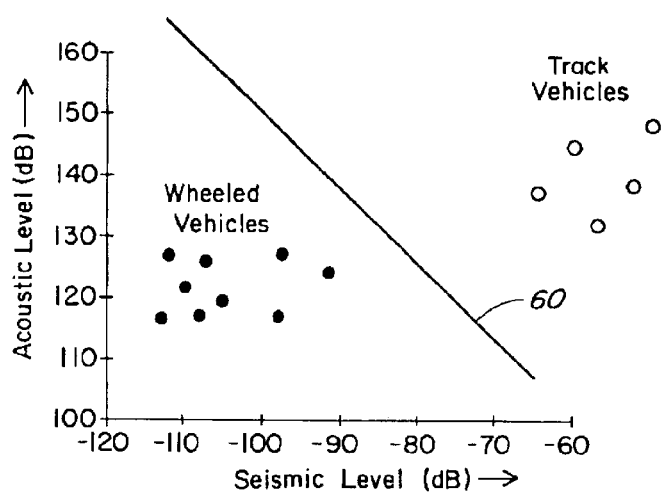
FIG. 3 is a graph of acoustic level versus seismic level for signals from the source which arrive at the array element of FIG. 2.

One having deduced these two quantities for a vehicle, one can graph the acoustic level for a vehicle as illustrated in FIG. 3. It has been found that, for the lightweight wheeled vehicles, the data points for the various vehicles lie to the left of a line 60 and more towards the origin of the graph, whereas, for heavier tracked vehicles, the seismic and acoustic noise lies to the right of line 60. (These values change for near and far fields.) This provides a relatively robust method for ascertaining the probability that an unseen and unknown vehicle which is transiting the array is either a wheeled vehicle or a tracked vehicle to a fairly high probability.

Referring back to FIG. 3, the output of microprocessor 50 is applied to transceiver 42 which in the first case is comprised of the calculated position or distance of the vehicle from transceiver 44 and thereafter after the calculation, transmits the conclusion of vehicle class to transceiver 44, which in this case forms a gateway hub for the receipt of information from the sensors and for outputting the class of vehicle that is transiting the array.

Figure 4:
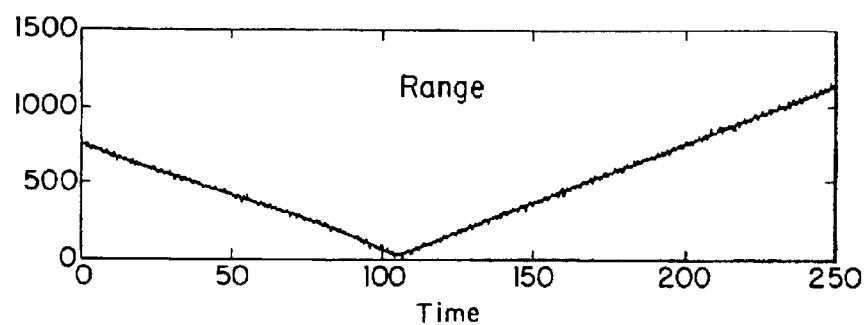
FIG. 4 is a graph of range versus time of a vehicle transiting through the array of FIG. 3.

Referring to FIG. 4, what is shown in a graph of range versus time for a vehicle transiting past a sensor.

Figure 5:
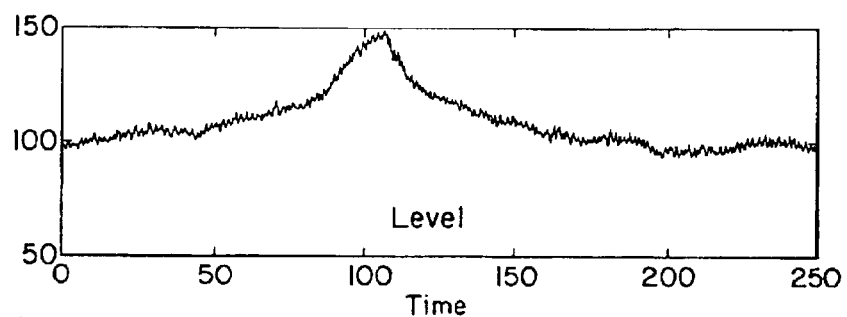
FIG. 5 is a graph of seismic level versus time for the vehicle transiting the array of FIG. 3.

Referring to FIG. 5, at the same time the acoustic level for the vehicle when graphed against time shows a pronounced a rise as the vehicle approaches the sensor and falls off as expected as vehicle goes away from the sensor.

The same is true for seismic noise although its absolute value is much more difficult to calculate than acoustic levels.

From the formula: $10 \log A^2 + 10 \log R = 10 \log A_0^2 - 10 \alpha R$ one can readily obtain the exponential decay factor for acoustic energy in the particular region involved. It will, however, be appreciated that the decrease in amplitude versus range for acoustic energy is fairly well established.

Figure 6:
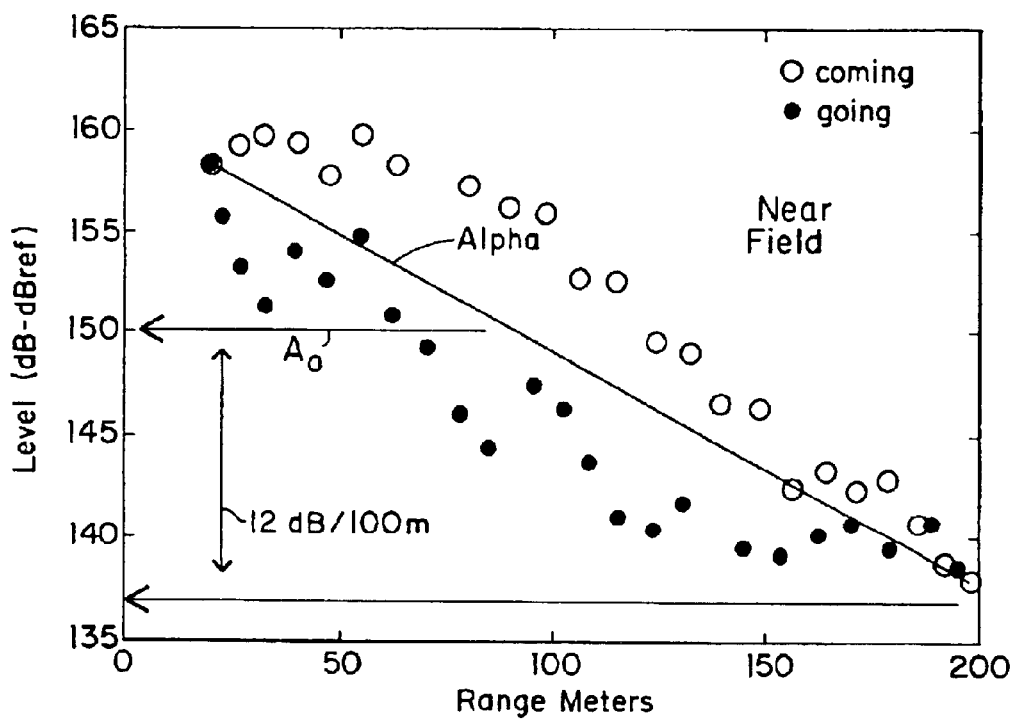
FIG. 6 is a graph of range versus seismic level for the vehicle at various ranges as the vehicle approaches the array and goes away from the array so as to permit the generation of a slope for the vehicle denoted as $\alpha$ in the near field.
Figure 7:
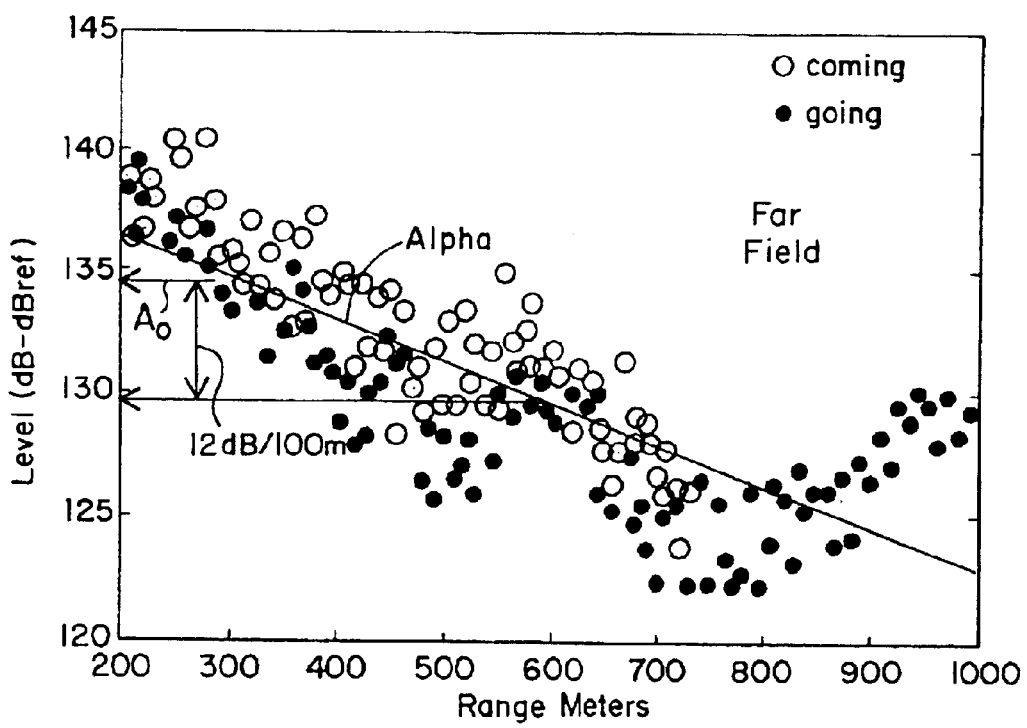
FIG. 7 is a graph of seismic level versus range in the far field for a vehicle transiting the array of FIG. 3 both coming and going thus to deduce an absolute value for the seismic level at a predetermined range and to deduce $\alpha$.
Figure 8:
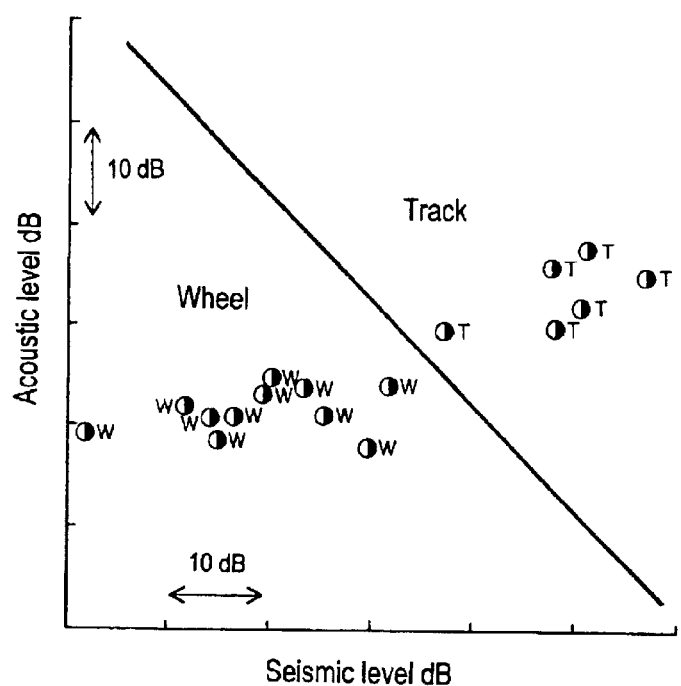
FIG. 8 is a graph showing seismic level versus acoustic level for assisting in track wheel classification.

However, as illustrated in FIG. 6 where seismic level is graphed against range for the near field, a technique has been found which by plotting incoming noise as a function of range for both the near field and the far field as illustrated in FIG. 7, one can curve fit a line, here shown as $\alpha$, to the data points, with the slope of the line determined the exponential decay factor. Here it can be seen as the vehicle approaches, sensor 36' of FIG. 2, there are a number of data points here labeled with circles which will generally lie above the line whose slope is $\alpha$. As the vehicle goes away from the sensor, the data lines indicated by asterisks lie below the line whose slope is $\alpha$. $\alpha$ is determined through curve fitting procedures to bisect these data points, with $\alpha$ being different for the various terrains involved. Here a 12 dB point-100 meters is established which yields an absolute value of the noise of the seismic noise, here labeled $A_0$. Thus, in the near field, one can establish not only $\alpha$ but also $A_0$ to be able to provide a data point for this type of vehicle on the graph of FIG. 3, which graphs acoustic level versus seismic level.

Referring to FIG. 7, the same type of measurement is done in the far field to as to arrive at an appropriate $\alpha$ and an appropriate $A_0$ at, for instance, 300 meters as illustrated. The 300 meters in one embodiment, refers to the spacing between the sensors in the array. Note that $A_0$ is 12 dB above the 300 m point.

With α and $A_0$ being defined in both the near and far field, it is possible to solve equation 1 and thus to be able to accurately depict on an amplitude versus seismic noise level graph the absolute values of the noise for a given terrain.

What has therefore been accomplished is that without knowing or having seen the vehicle transiting the array, one can deduce whether it is lightweight wheeled vehicle or a heavy tracked vehicle which is of some importance militarily.

Likewise, for commercial use, the difference between an 18-wheel truck and an a pick-up truck can be likewise deduced, with the subject system, for instance, being utilizable for border guarding purposes.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art.

What is claimed is:

1. A system for determining the type of vehicle traversing terrain from acoustic and seismic noise emitted therefrom, comprising:

an array of unattended detectors spaced about said terrain;

a module at one of the detectors for ascertaining absolute acoustic and seismic noise levels thereat and for determining vehicle type from a pair of acoustic and seismic noise levels, said absolute levels being derived from measuring said levels at a number of times and from ascertaining the distance of said vehicle to said one detector for each level measurement.

2. The system of claim 1, wherein said levels are determined from an exponential decay function having an exponential decay α derived from said measurements.

3. The system of claim 2, wherein the alpha for seismic noise is determined.

4. The system of claim 3, wherein the α for near field and for field distances from said vehicle are determined separately.

5. The system claim 3, wherein the absolute seismic levels for near and far field distances from said vehicle are determined separately.

6. The system of claim 1, and further including at each detector an array of microphones, a bearing line processor for determining the bearing to said vehicle, and means for transmitting the bearing to a remote location;

a position determining processor for ascertaining the position of said vehicle therefrom; and, a transmitter at said remote location for transmitting the position of said vehicle to said one detector.

7. The system of claim 6, wherein said one detector includes a vehicle type processor and a transceiver connected to said vehicle type processor for receiving the position of said vehicle and for calculating the absolute value of said noise and the appropriate exponential decay constant, and for determining vehicle type therefrom.

8. The system of claim 7, wherein said transceiver transmits the probability that said vehicle is of a predetermined type to a predetermined location.

9. A method for ascertaining the class of vehicle transiting an unattended detector array comprising the steps of:

determining the position of the vehicle from acoustic noise from the vehicle arriving at at least two detectors of said array;

detecting the absolute noise level of noise generated by the vehicle at one of said detectors based on the determined distance of the vehicle from said at least one detector; and, determining the likelihood that the vehicle is of a predetermined class based on the absolute noise level, the noise being seismic noise and the absolute noise level being dependent on the terrain over which the vehicle is transiting, the absolute noise level being dependent on an exponential decay function relating to the distance from the vehicle to the associated detector, the exponential decay constant being dependent upon the terrain.

10. The method of claim 9, wherein the noise is also acoustic noise.

11. The method of claim 9, wherein the seismic noise is near field noise.

12. The method of claim 9, wherein the seismic noise is far field noise.

* * * * *